Jan. 24, 1939. J. J. NEUMAN 2,145,228
AUTOMATIC CONTROL OF CENTRIFUGAL EXTRACTORS
Original Filed April 9, 1937 4 Sheets-Sheet 1

INVENTOR.
Jacob J. Neuman
By C. P. Goepel
his ATTORNEY.

Jan. 24, 1939.  J. J. NEUMAN  2,145,228
AUTOMATIC CONTROL OF CENTRIFUGAL EXTRACTORS
Original Filed April 9, 1937   4 Sheets-Sheet 4
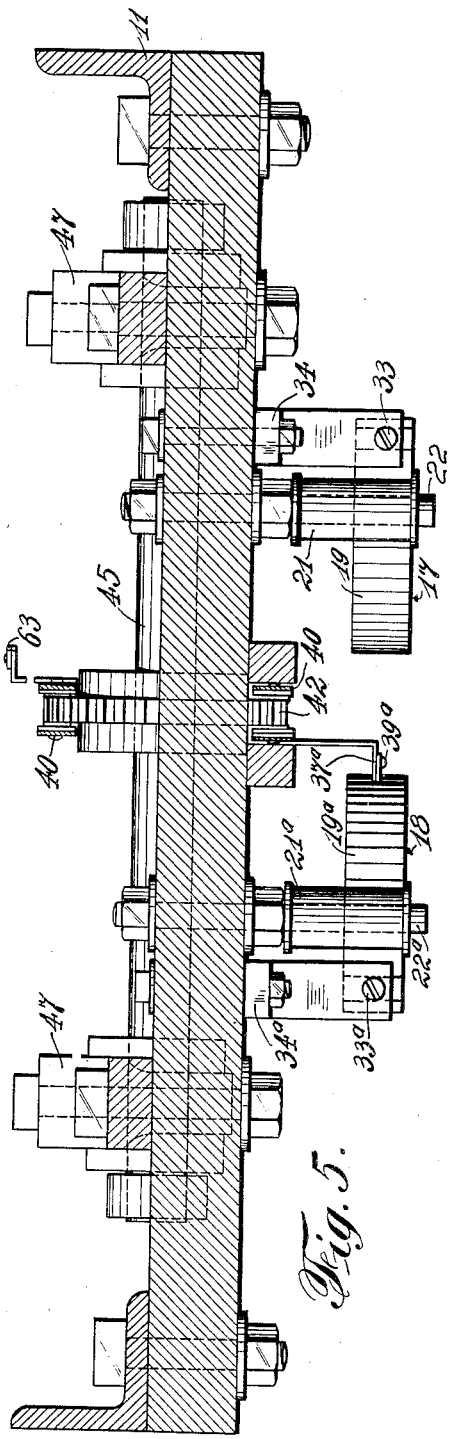
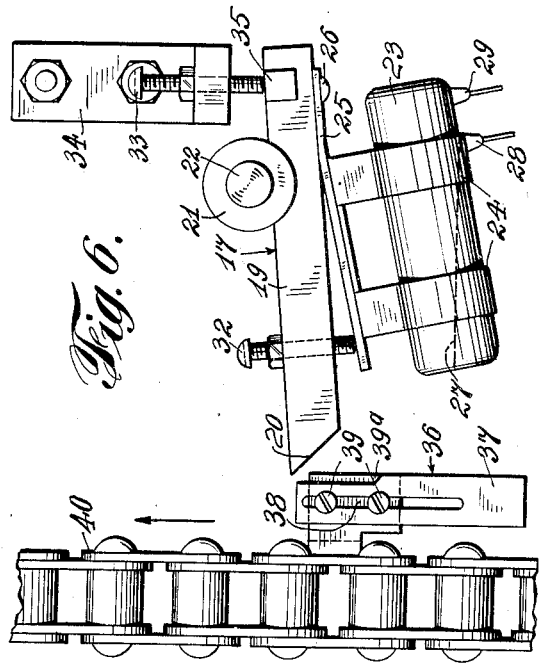
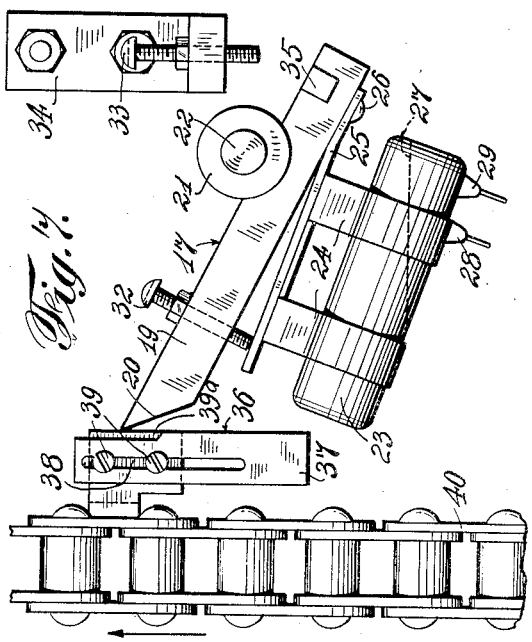
INVENTOR.
Jacob J. Neuman
BY
C. P. Gospel
his ATTORNEY.

Patented Jan. 24, 1939

2,145,228

UNITED STATES PATENT OFFICE 2,145,228

AUTOMATIC CONTROL OF CENTRIFUGAL EXTRACTORS

Jacob J. Neuman, Jamaica, N. Y., assignor to United States Patent Development and Royalty Company, South Salem, N. Y., a company of New York Original application April 9, 1937, Serial No. 135,879. Divided and this application September 16, 1937, Serial No. 164,115

7 Claims. (Cl. 200—32)

This invention relates to centrifugal extractor machines and more particularly to a sequence control for the cycles of the machines, and is a division of my co-pending application Serial No. 135,879, filed April 9, 1937, for Automatic control of centrifugal extractors.

An object of this invention is to provide an automatic control means for the cycles of extractor machines so that a series of extractor machines will operate in sequence and thereby discharge into a conveyor in such manner as not to crowd the conveyor.

At the present time it is the practice to provide control means for the discharge of the extractor machines, but where a series of such machines discharge into a common conveyor the individual control means cannot be accurately timed so that no two machines will discharge at the same time. The individual control means for the machines results in the acceleration of several machines at once which places an undue load on the power lines for the motors. It is, therefore, another object of this invention to provide a control means for use with any number of extractor machines which are arranged for discharge into a common conveyor which will maintain an even load on the power lines through the progressive acceleration of the motors.

A further object of this invention is to provide a control means of this character which will permit the ready inspection of the extractor machines at any time during each cycle so that the operator may inspect one machine and then progress to the next one whereas when the sequence control is not used the operator never knows which machine will discharge next.

A still further object of this machine is to provide a control means which is capable of various adjustments so that the cycle of each machine may be lengthened or shortened dependent upon the character of the material.

Still another object of this invention is the provision of a control means for the cycle of operation of the extractor motor so that where a sugar with heavy or sticky molasses or a small grain sugar is being run through the extractor and requires a longer spinning time the increase in the length of the cycle will also control the quantity of water and the time before the wash water is applied.

The control of the extractor may be expressed as follows:

$T_1$ = the time of cycle
$T_2$ = the time elapsed before the water is applied
$T_3$ = the amount of water
$S$ = the speed of the motor then $T_1 \propto S$
$T_2 \propto S$
$T_3 \propto S$ With the foregoing and other objects in view, the invention will be more fully described hereinafter, and will be more particularly pointed out in the claims appended hereto.

In the drawings, wherein like symbols refer to like or corresponding parts throughout the several views,—

Figure 5 is a sectional view taken on the line 5—5 of Figure 4;

Figure 6 is a fragmentary front elevation of one of the switch members in opened position and about to be engaged by the switch operating member;

Figure 7 is a view similar to Figure 6 but showing the switch member in closed position; and Figure 8 is a sectional view taken on the line 8—8 of Figure 4.

Figure 1:
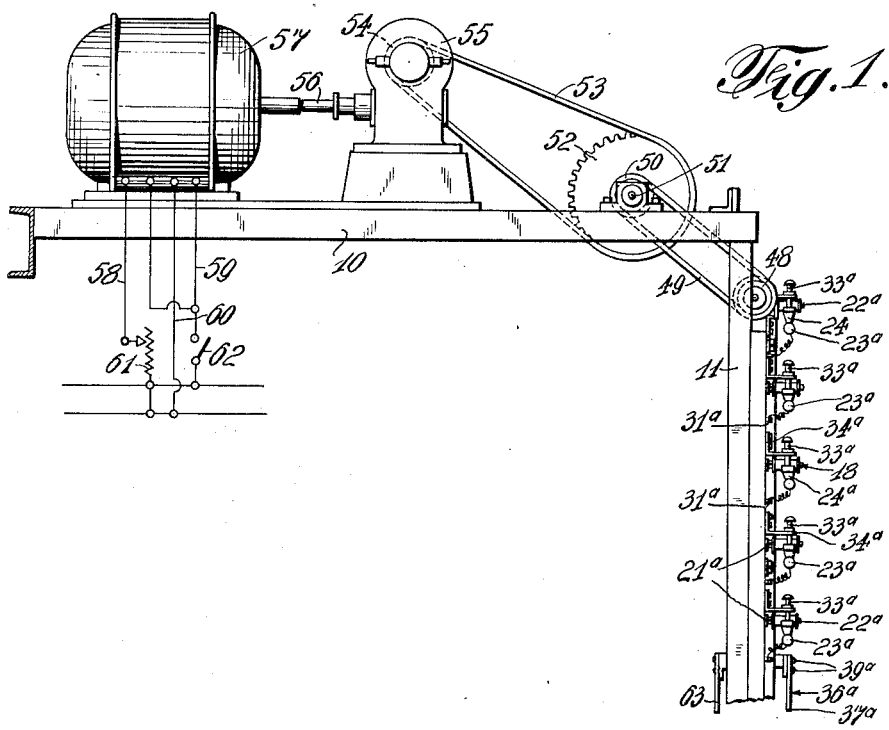
Figure 1 is a detail side elevation, partly broken away, of a centrifugal extractor control means constructed according to an embodiment of this invention.

Referring to the drawings, the numeral 10 designates a horizontally disposed frame which in the present instance is disposed in an elevated position and which is secured to the upper end of a vertically disposed frame 11. It is the general practice in the use and operation of centrifugal extractor machines to provide a number of these machines which discharge their product into one or more conveyors which convey the material to a collector which then carries the material to the desired point for distribution or other disposal.

During the operation of the extractor machine, it is the practice to use a solvent in the form of water which is fed to the machine during each cycle until the material is in such a condition that it may be discharged from the extractor machine. The provision of individual timing mechanisms for each machine are costly and in addition such mechanism cannot be regulated to the point where a satisfactory discharge of a series of machines can be effected without crowding or clogging of the conveyor and the consequent shutting down of certain machines and slowing up of other machines.

Figure 2:
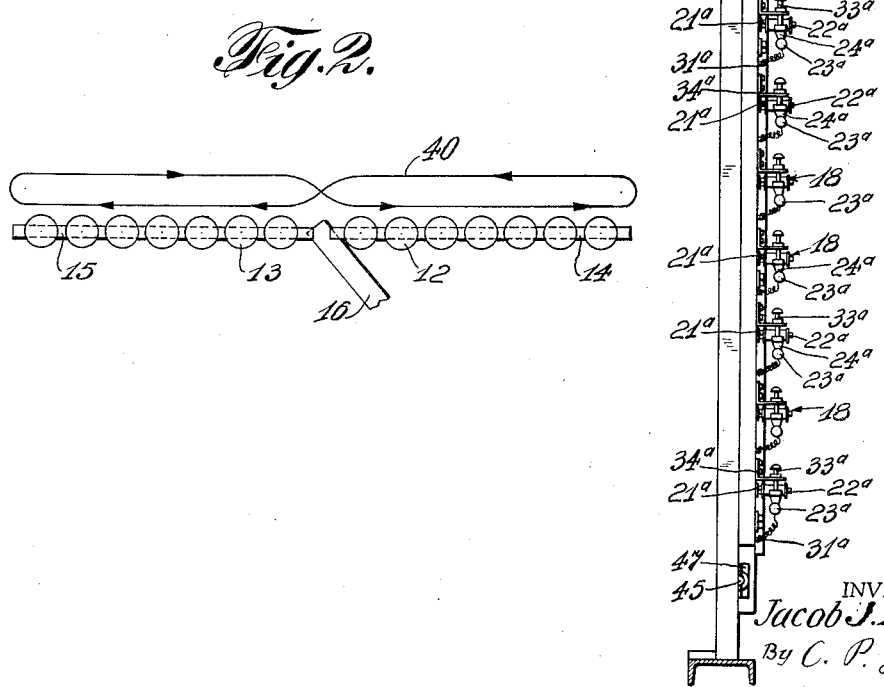
Figure 2 is a diagrammatic view showing the manner in which the extractor machines are operated in sequence by means of this invention.
Figure 3:
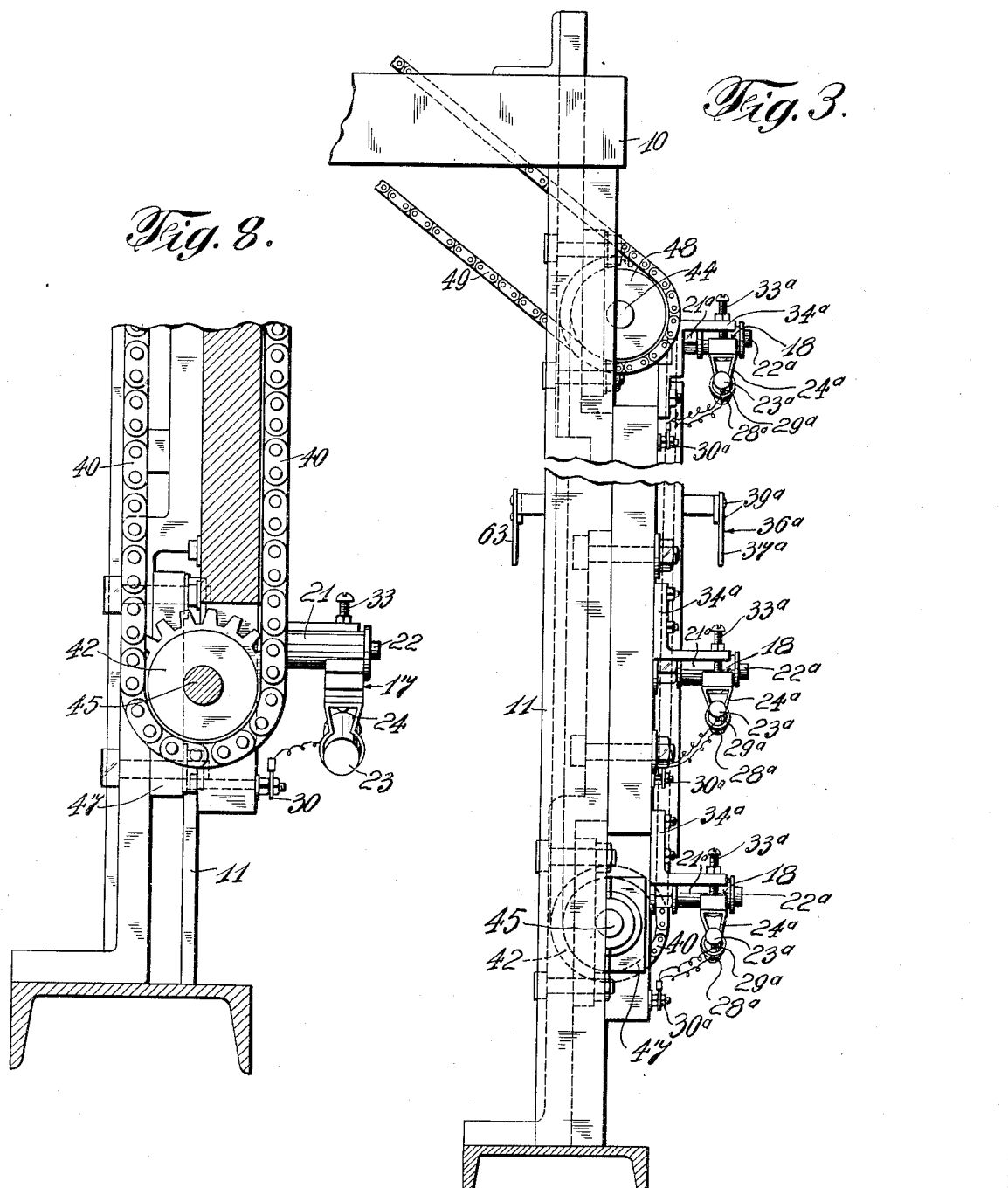
Figure 3 is an enlarged fragmentary side elevation of the control means.
Figure 4:
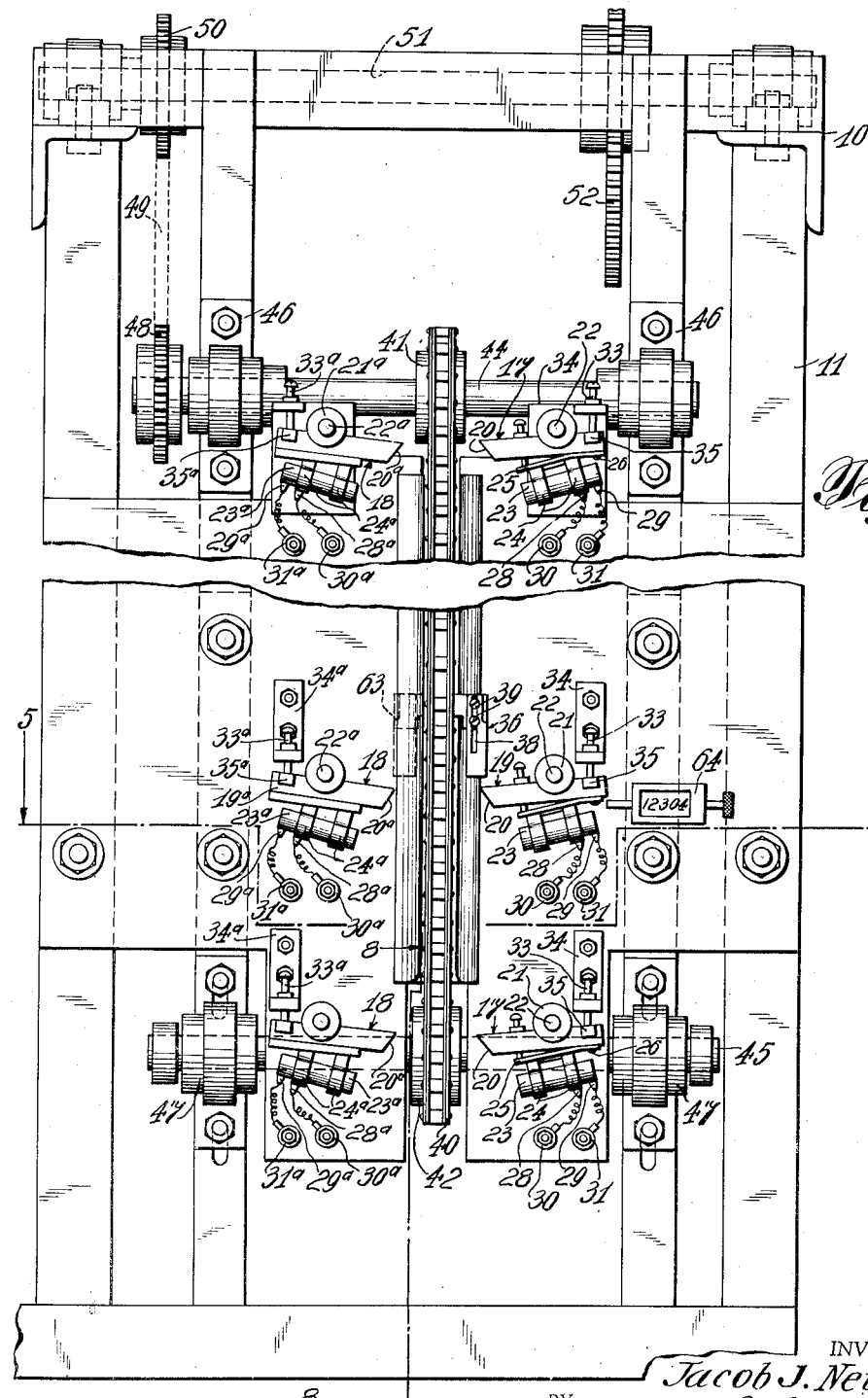
Figure 4 is a detail front elevation, partly broken away, of the control means.

In Figure 2, there is shown a series of centrifugal machines 12 and a second series of centrifugal machines 13 which are disposed in alinement and which discharge into conveyors 14 and 15, respectively. The conveyors 14 and 15 are in alinement and move toward each other and discharge their product onto a chute or third conveyor 16 which then moves the material to the desired point for additional treatment or other disposition. Any number of centrifugal machines 12 and 13 may be disposed in each series, there being shown seven such machines in the two series by way of illustration.

The motors which run the various machines 12 and 13 are under the control of a mechanism similar to the mechanism set forth in my copending application Serial No. 45,524, filed Oct. 10, 1935, the motor control mechanism being operated by pilot motors, and there being one pilot motor for each centrifugal machine. The operation of these pilot motors controls the cycle of each machine, and it is in order to provide a mechanism to control the operation of these pilot motors that the hereinafter described device has been constructed.

The vertical supporting frame 11 is provided with a plurality of vertically spaced apart switch supporting members 17 which are disposed in vertical alinement and a second series of vertically spaced apart switch supporting members 18 are secured to the frame 11 substantially opposite the supporting members 17.

The supporting members 17 comprise an arm 19 which is provided with a tapered inner end 20 and which has a boss 21 outwardly of the longitudinal center thereof engaging a trunnion 22 which is fixedly secured to the frame 11. A liquid switch member 23 is removably mounted in clips 24 secured to a yieldable supporting strap or bar 25 which is secured at one end, as by a bolt 26 to the under side of the arm 19. The switch member 23 is adapted to have a quantity of mercury disposed therein, and is provided with a pair of spaced apart contacts 28 and 29 which are adapted to be engaged by the mercury when the arm 19 is in raised position. The contacts 28 and 29 are adapted to be connected by relatively flexible conductors to terminals 30 and 31 carried by the frame 11, which terminals 30 and 31 are in turn adapted to be connected to the circuits of the pilot motors as shown in Figs. 13 and 14.

The inner or free end of the resilient strap 25 is adjusted relative to the arm 19 by means of an adjusting bolt 32 which is threaded through the arm 19 adjacent the inner end thereof and which engages the strap 25 so as to hold the switch 23 in the desired angular position with respect to the arm 19 and thus form one means for regulating the time during which the switch 23 is closed through engagement of the globule 27 with the contacts 28 and 29. An adjusting screw 33 is threaded through an L-shaped bracket 34 which is fastened to the frame 11, and the lower end of this screw 33 is adapted to engage the outer or short end of the rock arm 19 so as to limit the downward swinging movement of this arm to a circuit breaking position. Preferably a non-conducting block or insulating member 35 is carried by the outer or short end of the arm 19, and this member 35 may also serve as a cushioning means for the outer end of the arm 19. The interval of time between two successive closings of one of the switches 23 determines the duration of time of one complete cycle of the particular machine with which the pilot motor circuit of this switch 23 is associated.

Water controlling switch members 23a are disposed in opposed relation to the switch members 23, being mounted in clips 24a which are secured to supporting members 18. The supporting members 18 comprise a rock arm 19a provided with a boss 21a which engages a trunnion 22a. The short arm of the rock member 19a is provided with a block 35a engaged by an adjusting bolt 33a which is threaded into a bracket 34a fastened to the vertical supporting frame 11. The switch member 23a has conductors 28a and 29a secured thereto in spaced relation similar to the conductors 28 and 29 of the switch member 23, and these conductors 28a and 29a are connected to terminals 30a and 31a.

The switches 23 are rocked to a circuit closing position by means of a striker or tripping member 36. This tripping member or striker 36 comprises an elongated bar 37 provided with an elongated slot 38, and an adjusting bolt 39 engages through the slot 38 and adjustably secures the bar 37 to the bracket 39a which is secured in outstanding position to one side of a flexible member 40 in the form of an endless chain or the like. The chain 40 is trained over upper and lower sprockets 41 and 42, respectively, which are mounted on shafts 44 and 45, respectively. The shaft 44 is journaled in bearings 46 carried by the upper portion of the frame 11, and the shaft 45 is journaled in bearings 47 carried by the lower portion of the frame 11.

A sprocket or pulley 48 is secured to the shaft 44 and has a flexible member 49 trained thereover, the flexible member 49 being also trained over a second sprocket or pulley 50 mounted on a countershaft. The countershaft 51 carrying the counter-sprocket 50 has a relatively large sprocket 52 secured thereto, and a flexible member 53 engages over this sprocket 52. A sprocket 54 engages the flexible member 53, and this sprocket 54 is secured to a reduction gearing 55 of conventional construction. The reduction gearing 55 is operated by means of a shaft 56 which is connected to a motor or power member 57. The motor 57 is connected to a suitable source of electric current supply by means of conductors 58, 59, 60. Preferably, the amount of current supplied the motor 57 is controlled through the medium of a rheostat 61 which is interposed in the conductor 58. A switch 62 may be interposed in the conductor 59 so as to cut off the current supply when desired. While the reduction gearing 55 and the reducing sprockets connecting this gearing with the shaft 44 will reduce the speed of operation of this shaft, the speed of the shaft 44 may be further reduced through the operation of the resistance or rheostat 61 so that any desired timing may be effected for the switches 23.

The switches 23a may be tripped by means of a tripping member 63 which is secured to the chain 40 on the side thereof opposite from the tripping member 36. This tripping member 63 may be secured to the opposite side of the tripping member 36 in a position so that when the tripping member 36 is on the front run of the chain 40 the tripping member 63 is on the rear run of the chain. The spacing between these tripping members 36 and 63 may be varied at will, and if desired additional tripping members of the same type may be secured to the chain 40 so as to in this manner effect a more rapid tripping of the switches 23 and 23a.

The front run of the chain 40 moves upwardly, and the lowermost switch 23 is secured to the pilot motor controlling the centrifugal machine closest to the chute or conveyor 16 in the series 12 of these machines, and in like manner the lowermost switch 23a is connected to the water controlling circuit of the same centrifugal machine in the series 12. The succeeding switches 23 are connected to the succeeding centrifugal machines in the series 12 from the innermost machine to the outermost machine, so that the cycle of each centrifugal machine is set in operation in sequence beginning with the innermost machine. In this manner, the innermost machine will complete its cycle and discharge its load onto the conveyor 14, and the remaining machines will follow in sequence until the last machine in the series has completed its cycle and discharged its load. The tripping member 36 now continues up the panel 11 tripping the switches 23 associated with the series of machines 13, starting likewise with the innermost machine and continuing until the machines in the series 13 have all completed their cycle and discharged into the conveyor 15. In the meantime, the tripping member 63 has been tripping the switches 23a, thus turning on the water for each of the machines at the proper time as determined by its position relative to the tripping member 36.

In order to provide a means whereby the number of cycles may be registered or counted, I have provided a counting device 64 which is operatively engaged with one of the supporting members 17, and is moved forward one division each time this one supporting member 17 is tripped by the tripping member 36.

It is obvious that various changes and modifications may be made in the details of construction and design of the above specifically described embodiment of this invention without departing from the spirit thereof, such changes and modifications being restricted only by the scope of the following claims.

I claim:—

1. A centrifugal extractor control means for centrifugal extractor machines disposed in spaced apart alinement comprising a vertically disposed frame, a plurality of switches, means for swingably mounting said switches on said frame in vertically spaced apart alinement, said switches adapted to be connected one to each machine and in sequence, said mounting means including means gravitatingly holding said switches in open position, a tripping member, a flexible supporting member for said tripping member, means for mounting said flexible supporting member for movement relative to said frame and said switches whereby said tripping member will engage said switches in sequence from one end of the frame to the other end, said latter means including adjustable means for controlling the closing period of each switch, and operating means for said flexible member.

2. A centrifugal extractor control means for centrifugal extractor machines disposed in spaced apart alinement comprising a vertically disposed frame, a plurality of switches, means for swingably mounting said switches on said frame in vertically spaced apart alinement, said switches adapted to be connected one to each machine and in sequence, said mounting means including means gravitatingly holding said switches in open position, a tripping member, a flexible supporting member for said tripping member, means for mounting said flexible supporting member for movement relative to said frame and said switches whereby said tripping member will engage said switches in sequence from one end of the frame to the other end, said latter means including adjustable means for controlling the closing period of each switch, operating means for said flexible member, and control means for said operating means.

3. A centrifugal extractor control means for centrifugal extractor machines disposed in spaced apart alinement comprising a vertically disposed frame, a plurality of switches, means for swingably mounting said switches on said frame in vertically spaced apart alinement, said switches adapted to be connected one to each machine and in sequence, said mounting means including means gravitatingly holding said switches in open position, a tripping member engageable with said switches to maintain said switches in closed position for a predetermined period, said tripping member including means whereby the closed period of the switches may be varied at will, means moving said tripping member progressively past said switches, and operating means for said latter means.

4. A centrifugal extractor control means for centrifugal extractor machines disposed in spaced apart relation comprising a vertically disposed frame, a plurality of vertically spaced apart rock arms carried by said frame, a plurality of switches, means for mounting said switches on said rock arms, said switches adapted to be connected one to each machine and in sequence, said rock arms gravitatingly holding said switches in open position, adjustable means for said mounting means for said switches, a switch tripping member, means for mounting said tripping member for movement relative to said rock arms whereby to swing said arms upwardly to thereby close said switches, said latter means including adjustable means for controlling the closing period of each switch, said tripping member progressively engaging said rock arms whereby to trip said switches to closed position in sequence, and operating means for said tripping member mounting means.

5. A centrifugal extractor control means for centrifugal extractor machines disposed in spaced apart relation comprising a vertically disposed frame, a plurality of vertically spaced apart rock arms carried by said frame, means for swingably mounting said rock arms on said frame in a manner whereby the inner end of said rock arm will gravitatingly swing downwardly, a plurality of liquid switches, means for mounting a switch on a rock arm, said switches adapted to be connected to said machines, an extensible tripping member, and means for moving said tripping member progressively past said rock arms whereby to swing the inner ends of said rock arms upwardly to thereby close said switch.

6. A centrifugal extractor control means for centrifugal extractor machines disposed in spaced apart relation comprising a vertically disposed frame, a plurality of vertically spaced apart rock arms carried by said frame, means for swingably mounting said rock arms on said frame in a manner whereby the inner end of said rock arm will gravitatingly swing downwardly, a plurality of liquid switches, means for mounting a switch on a rock arm, said switches adapted to be connected to said machines, an endless chain, means for mounting said chain for movement relative to said frame and the inner ends of said rock arms, operating means for said chain, and a tripping member carried by said chain and disposed in the path of said rock arms whereby to swing the inner ends of said rock arms upwardly to thereby close said switches, said tripping member including a part fixed to said chain, a second part, and means adjustably securing said parts together whereby to adjust the length of the closing period.

7. A centrifugal extractor control means for centrifugal extractor machines disposed in spaced apart relation comprising a vertically disposed frame, a plurality of vertically spaced apart rock arms carried by said frame, the inner end of said rock arms being normally disposed in a downwardly inclined position, a plurality of liquid switches carried one by each rock arm, said switches adapted to be connected to said machines, upper and lower sprockets carried by said frame, a chain trained over said sprockets, a rock arm tripping member carried by said chain, said tripping member including a pair of extensible members adjustably secured together to adjust the length of the closing period, operating means operatively connected to one of said sprockets, and speed regulating means connected to said operating means.

JACOB J. NEUMAN.